(12) United States Patent
Krishna et al.

(10) Patent No.: US 7,820,124 B1
(45) Date of Patent: Oct. 26, 2010

(54) MONODISPERSE NANOPARTICLES AND METHOD OF MAKING

(75) Inventors: Kalaga Murali Krishna, Karnataka (IN); Sergio Paulo Martins Loureiro, Saratoga Springs, NY (US); Mohan Manoharan, Niskayuna, NY (US); Geetha Karavoor, Kerala (IN); Shweta Saraswat, Karnataka (IN)

(73) Assignee: General Electric Company, Niskayuna, NY (US)

( * ) Notice: Subject to any disclaimer, the term of this patent is extended or adjusted under 35 U.S.C. 154(b) by 975 days.

(21) Appl. No.: 11/543,608

(22) Filed: Oct. 5, 2006

Related U.S. Application Data

(62) Division of application No. 10/872,868, filed on Jun. 21, 2004, now abandoned.

(51) Int. Cl.
*C07C 2/00* (2006.01)

(52) U.S. Cl. ............... 423/263; 423/305; 423/604; 423/605; 423/606; 423/607; 423/608; 423/609; 423/610; 423/622; 423/632; 423/594.17; 423/594.18; 423/594.19; 423/600; 423/592.1; 423/326; 423/327.1; 423/279; 252/301.4 P

(58) Field of Classification Search ............... 423/263, 423/305, 279–282, 600, 326–334, 592.1, 423/604–610, 622, 632, 594.17, 594.18; 252/301.4 P
See application file for complete search history.

(56) References Cited

U.S. PATENT DOCUMENTS

| | | | | |
|---|---|---|---|---|
| 3,672,831 | A * | 6/1972 | Duecker | 423/628 |
| 5,376,305 | A * | 12/1994 | Chane-Ching et al. | 516/89 |
| 5,698,758 | A * | 12/1997 | Rieser et al. | 585/502 |
| 5,922,330 | A | 7/1999 | Chane-Ching et al. | 424/401 |
| 6,692,660 | B2 * | 2/2004 | Kumar | 252/301.4 R |
| 6,832,735 | B2 * | 12/2004 | Yadav et al. | 241/16 |
| 6,866,825 | B2 * | 3/2005 | Chiou et al. | 422/100 |
| 6,869,584 | B2 * | 3/2005 | Ying et al. | 423/600 |
| 6,876,796 | B2 * | 4/2005 | Garito et al. | 385/50 |
| 2003/0027033 | A1 * | 2/2003 | Seabaugh et al. | 429/40 |
| 2004/0247503 | A1 * | 12/2004 | Hyeon | 423/1 |

FOREIGN PATENT DOCUMENTS

| | | | |
|---|---|---|---|
| WO | WO 01/32558 A1 * | 5/2001 | |
| WO | WO 02/45841 A1 * | 6/2002 | |

OTHER PUBLICATIONS

Xueyan Wu et al., "*Vacuum Ultraviolet Optical Properties of (La, Gd)PO₄:RE³⁺+(RE=Eu, Tb)*", Materials Research Bulletin 37, pp. 1531-1538, 2002.

S. Buddhudu et al., "*Green Color Luminescence in Tb³+: (La,Ln)PO₄ (Ln=Gd or Y) Photonic Materials*", Elsevier, Materials Science & Engineering, B72, p. 27-30, 2000.

EJ Bosze et al., "*Improving the Efficiency of a Blue-Emitting Phosphor by an Engergy Transfer From $Gd^{3+}$ to $CE^{3+}$*", Elsevier, Journal of Luminescence, 104, pp. 47-54, 2003.

Shi-Jin Ding et al., "*Preparation and Photoluminescence of the Ce-, Tb- and Gd-doped Lanthanum Borophosphate Phosphor*", Elsevier, Materials Chemistry and Physics, 68, pp. 98-104, 2001.

U. Rambabu et al., "*Optical Properties of $LnPO_4$:$Tb^{3+}$ (Ln=Y, La and Gd) Powder Phosphors*", Elsevier, Materials Chemistry and Physics, 70, pp. 1-6, 2001.

U. Rambabu et al., "*Emission Spectra of $LnPO_4$:$RE^{3+}$ (Ln=La, Gd; RE=Eu, Tb and Ce) Powder Phosphors*", Elsevier, Materials Chemistry and Physics, 78, pp. 160-169, 2002.

* cited by examiner

*Primary Examiner*—Steven Bos
(74) *Attorney, Agent, or Firm*—Mary Louise Gioeni

(57) ABSTRACT

A material comprising a plurality of nanoparticles. Each of the plurality of nanoparticles includes at least one of a metal phosphate, a metal silicate, a metal oxide, a metal borate, a metal aluminate, and combinations thereof. The plurality of nanoparticles is substantially monodisperse. Also disclosed is a method of making a plurality of substantially monodisperse nanoparticles. The method includes providing a slurry of at least one metal precursor, maintaining the pH of the slurry at a predetermined value, mechanically milling the slurry, drying the slurry to form a powder; and calcining the powder at a predetermined temperature to form the plurality of nanoparticles.

19 Claims, 2 Drawing Sheets

1

MONODISPERSE NANOPARTICLES AND METHOD OF MAKING

This application is a division of application Ser. No. 10/872,868, filed 21 Jun. 2004, and now abandoned, which is hereby incorporated by reference in its entirety.

BACKGROUND OF INVENTION

Nanomaterials are used in processing steps in the fabrication of scintillators for imaging applications and as phosphors for lighting applications. The performance and utility of such materials depends on the size, shape, and morphology of the nanoparticles. Consequently, efforts have been directed toward producing nanomaterials with controlled properties for such applications.

Various synthesis routes, such as sol-gel, colloidal, precipitation, combustion synthesis, water assisted reaction milling (hereinafter referred to as "WARM") and solid-state methods have been used to produce nanomaterials. However, currently available methods do not provide substantially monodisperse nanoparticles of metal phosphates, silicates, oxides, borates and aluminates. Therefore, what is needed is such material made using a process yielding substantially monodisperse nanoparticles of metal phosphates, silicates, oxides, borates and aluminates. In addition, the above mentioned synthesis routes generally require atmospheric control and hazardous solvents. What is also needed is a water assisted reaction milling based method to make substantially monodisperse nanoparticles of such materials.

BRIEF SUMMARY OF THE INVENTION

The present invention meets these and other needs by providing a material comprising a plurality of nanoparticles of metal phosphates, silicates, oxides, borates, or aluminates that are unagglomerated and substantially monodisperse. The present invention also provides a method of forming such materials using a water assisted reaction milling process (hereinafter referred to as "WARM").

Accordingly, one aspect of the invention is to provide a material comprising a plurality of nanoparticles. Each of the plurality of nanoparticles comprises at least one of a metal phosphate, a metal silicate, a metal oxide, a metal borate, a metal aluminate, and combinations thereof. The plurality of nanoparticles is substantially monodisperse.

A second aspect of the invention is to provide a plurality of nanoparticles comprising at least one of a metal phosphate, a metal silicate, a metal oxide, a metal borate, a metal aluminate, and combinations thereof. The plurality of nanoparticles is formed by: forming a slurry comprising at least one metal precursor; mechanically milling the slurry; drying the slurry to form a powder; and calcining the powder at a predetermined temperature to form the plurality of nanoparticles.

A third aspect of the invention is to provide a material comprising a plurality of nanoparticles. Each of the plurality of nanoparticles comprises at least one of a metal phosphate, a metal silicate, a metal oxide, a metal borate, a metal aluminate, and combinations thereof. The plurality of nanoparticles is formed by: providing a slurry comprising at least one metal precursor; mechanically milling the slurry; drying the slurry to form a powder; and calcining the powder at a predetermined temperature to form the plurality of nanoparticles. The plurality of nanoparticles is substantially monodisperse and substantially unagglomerated.

A fourth aspect of the invention is to provide a method of making a plurality of nanoparticles. The plurality of nanoparticles comprises at least one of a metal phosphate, a metal silicate, a metal oxide, a metal borate, a metal aluminate, and combinations thereof and the plurality of nanoparticles is substantially monodisperse. The method comprises the steps of: providing a slurry of at least one metal precursor; maintaining the pH of the slurry at a predetermined value; mechanically milling the slurry; drying the slurry to form a powder; and calcining the powder at a predetermined temperature to form the plurality of nanoparticles.

These and other aspects, advantages, and salient features of the present invention will become apparent from the following detailed description, the accompanying drawings, and the appended claims.

DETAILED DESCRIPTION OF THE INVENTION

Figure 1:
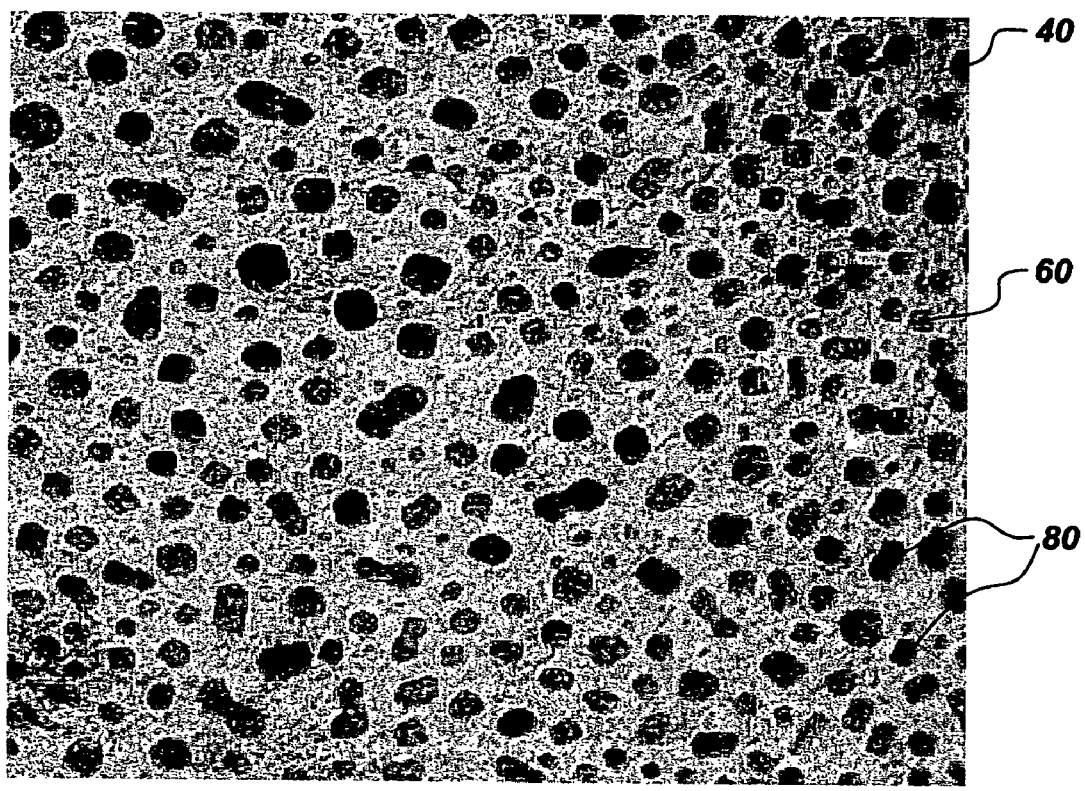
FIG. 1 is an electron micrograph showing a gadolinium lanthanum phosphate material comprising a plurality of nanoparticles prepared according to the present invention.

In the following description, like reference characters designate like or corresponding parts throughout the several views shown in the figures. It is also understood that terms such as "top", "bottom", "outward", "inward", and the like are words of convenience and are not to be construed as limiting terms.

Referring to the drawings in general and to FIG. 1 in particular, it will be understood that the illustrations are for the purpose of describing a preferred embodiment of the invention and are not intended to limit the invention thereto.

Water assisted reaction milling (WARM) is an attractive route for making nanoparticles due to the high particulate homogeneity obtained from a liquid phase process, simplicity in process design, the absence of by-products and side reactions, and high process yield. The WARM process typically involves the choice of an inorganic metal precursor in a slurry that is mechanically milled. The slurry is dried to provide a powder that is calcined to yield a plurality of nanoparticles.

The present invention employs the WARM process to provide a material comprising a plurality of nanoparticles. Each of the plurality of nanoparticles comprises at least one of a metal phosphate, a metal silicate, a metal oxide, a metal borate, a metal aluminate, and combinations thereof. The plurality of nanoparticles is substantially monodisperse. The WARM process may be used to form any one of the above mentioned materials or any combination thereof. The WARM process is also provided as a method of making a plurality of the nanoparticles, the details of which are described herein.

In the present invention, the term "monodisperse particles" means particles possessing a narrow average particle size distribution. In one particular embodiment, the nanoparticles possess a narrow average particle size distribution with less than 5% size dispersion, meaning that less than 5% of the population lies on either side of the mean particle size value.

In one embodiment of the invention, shown in FIG. 1, a gadolinium lanthanum phosphate material 20, comprises a plurality of nanoparticles 40. Each of the plurality of nanoparticles 40 comprises at least one of a metal phosphate, a metal silicate, a metal oxide, a metal borate, a metal aluminate, and combinations thereof, and wherein the plurality of nanoparticles 40 is substantially monodisperse 60. Each of the nanoparticles 40 may comprise any one of the aforementioned compounds or any combination thereof. Frequently, the plurality of nanoparticles 40 is substantially unagglomerated 80. In one embodiment, the metal is a transition metal, such as, but not limited to, scandium, titanium, vanadium, chromium, manganese, iron, cobalt, nickel, copper, zinc, zirconium, niobium, molybdenum, ruthenium, rhodium, palladium, silver, cadmium, hafnium, tantalum, tungsten, rhenium, osmium, iridium, platinum, gold, and combinations thereof. In another embodiment, the metal is a lanthanide group metal. In one embodiment, the lanthanide group metal is one of lanthanum, gadolinium, yttrium, lutetium, terbium, cerium, neodymium, samarium, europium, thulium, holmium, praseodymium, dysprosium and combinations thereof. It is understood that the plurality of nanoparticles 40 may comprise any one of the aforementioned metals or any combination thereof.

The plurality of nanoparticles 40 has a mean particle size in a range from about 10 nm to about 1000 nm. In a preferred embodiment, the plurality of nanoparticles 40 has a mean particle size in a range from about 10 nm to about 100 nm. In a more preferred embodiment, the plurality of nanoparticles 40 has a mean particle size in a range from about 10 nm to about 50 nm.

A second aspect of the invention is to provide a plurality of nanoparticles 40 comprising at least one of a metal phosphate, a metal silicate, a metal oxide, a metal borate, a metal aluminate, and combinations thereof. Each of the nanoparticles 40 may comprise any one of the aforementioned compounds or any combination thereof. As represented in the flow chart shown in FIG. 2, the plurality of nanoparticles 40 is formed by forming a slurry 110 comprising at least one metal precursor, mechanically milling the slurry 130, drying the slurry 140 to form a powder 150, and calcining the powder 160 at a predetermined temperature to form the plurality of nanoparticles 170.

In one embodiment of the present invention, the at least one metal precursor comprises at least one of a metal nitrate, a metal chloride, a metal carbonate, a metal oxide, a metal acetate, and combinations thereof. In one embodiment of the present invention, a second precursor is used in addition to the at least one metal precursor to provide the slurry. The second precursor comprises at least one of a metal nitrate, a metal chloride, a metal carbonate, a metal oxide, a metal acetate, a borate source, a phosphate source, a silicate source, and combinations thereof. Non-limiting examples of a borate source include boric acid, boranes, and the like. Phosphate sources include, but are not limited to, di-ammonium hydrogen phosphate, phosphoric acid, phosphorous pentoxide, and the like. Examples of silicate sources include, but are not limited to, organosilicates, such as tetramethylorthosilicate (TMOS), tetraethylorthosilicate (TEOS), and the like. Each of the at least one metal precursor and the second precursor may comprise any one of the aforementioned compounds or any combination thereof. In another embodiment, a surfactant is additionally used to form the slurry. The surfactant may comprise at least one of sodium dodecyl sulfate (SDS), cetyltrimethylammonium bromide (CTAB) phosphatidylcholine, sorbitan monostearate SPAN-60 synthetic wax, polysorbate TWEEN-80 nonionic surfactant and emulsifier, sodium dioctylsulfosuccinate (AOT), dioctadecyldimethylammonium bromide (DODAB), combinations thereof, and the like. The surfactant may comprise any one of the aforementioned compounds or any combination thereof. In another embodiment, oxalic acid can also be used to form the slurry.

A surfactant is a surface active chemical agent that reduces the surface tension of a liquid and thus allow it to foam or penetrate solids. Surfactancy hence provides a means to disperse or sometimes precipitate colloidal or sol particles. In the present invention, a surfactant is employed to increase the dispersing volume of the reactant precursors. A slurry is a liquid mixture of water and an insoluble solid material. Independently, or in combination with a surfactant, a slurry may provide a colloidal solution or an emulsion.

Figure 2:
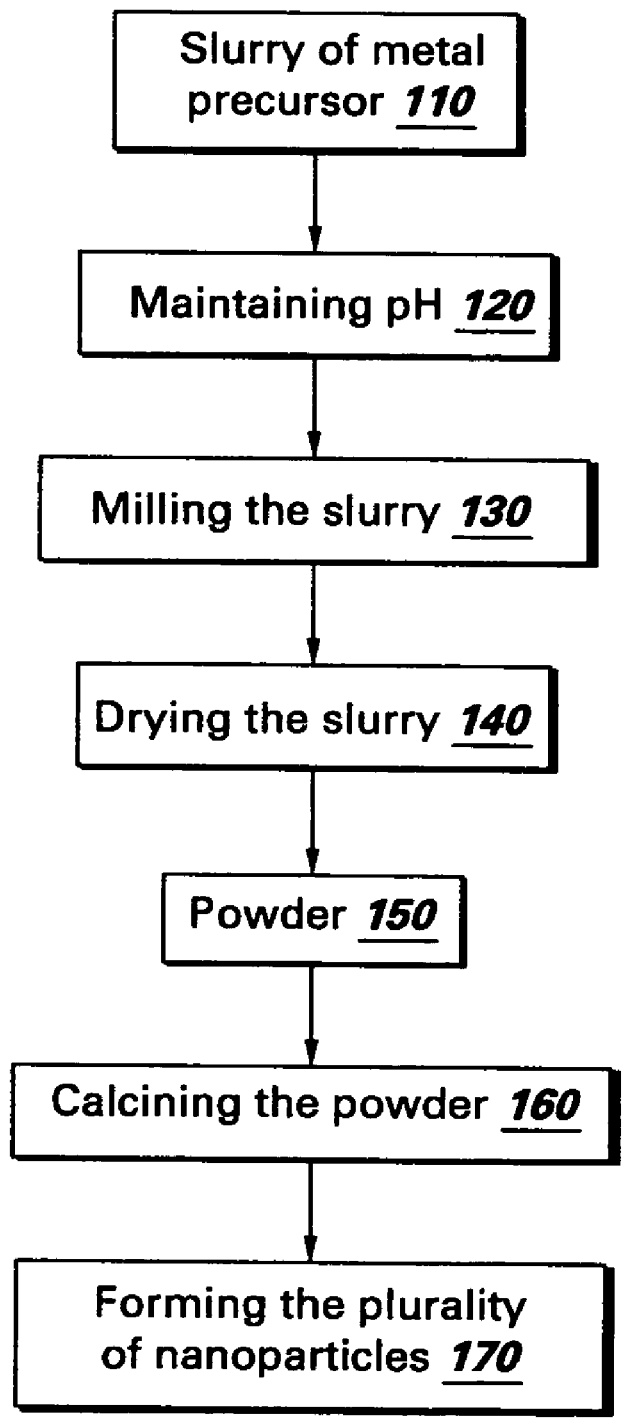
FIG. 2 is a flow chart illustrating the method for making a plurality of nanoparticles according to the present invention.

In the WARM process described herein, which is a method 100 of providing the plurality of nanoparticles 40, slurry 110 is mechanically milled using a variety of milling means such as, but not limited to, dry or wet grinding, dry or wet ball milling, pultrusion, and the like. The objective of milling is to reduce the particle size of the slurry to within the nanometer regime. The milling step is represented in FIG. 2 as step 130. As shown in step 140, the slurry is dried to yield a powder 150. Typically, the slurry is dried in air at a temperature in a range from about 100° C. to about 150° C. to yield powder 150.

In one embodiment, the dried powder is calcined 160 at a predetermined temperature in a range from about 600° C. to about 1200° C. During calcination metal salts are converted into their respective oxides as a result of heating to a high temperature. In a preferred embodiment, powder 150 is calcined by heating at a temperature in a range from about 800° C. to about 900° C. Calcination is usually performed for a time period between about 1 hour and about 6 hours. In a preferred embodiment, powder 150 is calcined for between about 2 hours and about 3 hours. Subsequent to calcination 160, a plurality of nanoparticles 40 is obtained via step 170.

A third aspect of the invention is to provide a material 20 comprising a plurality of nanoparticles 40. Each of the plurality of nanoparticles 40 comprises at least one of a metal phosphate, a metal silicate, a metal oxide, a metal borate, a metal aluminate, and combinations thereof. The WARM process may be used to form any one of the above mentioned materials or any combination thereof. The plurality of nanoparticles 40 is formed by providing a slurry 110 comprising at least one metal precursor, mechanically milling 130 the slurry, drying the slurry 140 to form a powder 150, and calcining the powder 160 at a predetermined temperature to form the plurality of nanoparticles 40. The plurality of nanoparticles 40 is substantially monodisperse 60 and substantially unagglomerated 80.

A fourth aspect of the invention is to provide a method 100 of making a plurality of nanoparticles 40. The plurality of nanoparticles 40 comprises at least one of a metal phosphate, a metal silicate, a metal oxide, a metal borate, a metal aluminate, and combinations thereof. Each of the nanoparticles 40 may comprise any one of the aforementioned compounds or any combination thereof. The plurality of nanoparticles is substantially monodisperse 60. The method comprises providing a slurry of at least one metal precursor 110, maintaining the pH of the slurry at a predetermined value 120, mechanically milling the slurry 130, drying the slurry 140 to form a powder 150, and calcining the powder 160 at a predetermined temperature to form the plurality of nanoparticles 170.

An exemplary sketch of the process is represented in FIG. 2. In one embodiment of the present invention, the pH of the slurry is maintained at a value in a range from about 0.5 to about 5.0. In a preferred embodiment, the pH of the slurry is maintained in a range from about 1.0 to about 3.0.

In one embodiment of the present invention, the at least one metal precursor comprises at least one of a metal nitrate, a metal chloride, a metal carbonate, a metal oxide, a metal acetate, and combinations thereof. In one embodiment of the present invention, a second precursor is used in addition to the at least one metal precursor to provide the slurry. The second precursor comprises at least one of a metal nitrate, a metal chloride, a metal carbonate, a metal oxide, a metal acetate, a borate source, a phosphate source, a silicate source, and combinations thereof. Each of the at least one metal precursor and the second precursor may comprise any one of the aforementioned compounds or any combination thereof. In another embodiment of the present invention, a surfactant is additionally used to provide the slurry. The surfactant may comprise at least one of, sodium dodecyl sulfate (SDS), cetyltrimethylammonium bromide (CTAB) phosphatidylcholine, sorbitan monostearate SPAN-60 synthetic wax, polysorbate TWEEN-80 nonionic surfactant and emulsifier, sodium dioctylsulfosuccinate (AOT), dioctadecyldimethylammonium bromide (DODAB), combinations thereof, and the like. The surfactant may comprise any one of the aforementioned compounds or any combination thereof. In another embodiment, oxalic acid can also be used to form the slurry.

In the WARM process described herein, which is a method 100 of providing the plurality of nanoparticles 40, slurry 110 is mechanically milled using a variety of milling means such as, but not limited to, dry or wet grinding, dry or wet ball milling, pultrusion, and the like. The objective of milling is to reduce the particle size of the slurry to within the nanometer regime. The milling step is represented in FIG. 2 as step 130. As shown in step 140, the slurry is dried to yield a powder 150. Typically, the slurry is dried in air at a temperature in a range from about 100° C. to about 150° C. to yield powder 150.

In one embodiment, the dried powder is calcined 160 at a predetermined temperature in a range from about 600° C. to about 1200° C. During calcination metal salts are converted into their respective oxides as a result of heating to a high temperature. In a preferred embodiment, powder 150 is calcined by heating at a temperature in a range from about 800° C. to about 900° C. Calcination is usually performed for a time period between about 1 hour and about 6 hours. In a preferred embodiment, powder 150 is calcined for between about 2 hours and about 3 hours. Subsequent to calcination 160, a plurality of nanoparticles 40 is obtained via step 170.

The following example illustrates the features and advantages of the invention, and is not intended to limit the invention in any way.

Example 1

A 10 g batch of gadolinium lanthanum phosphate doped with cerium and terbium, having 37 mole percent lanthanum, 20 mole percent gadolinium, 28 mole percent cerium, and 15 mole percent terbium was prepared. A precursor slurry was prepared by mixing hexahydrate lanthanum nitrate (6.65 g), hexahydrate gadolinium nitrate (3.75 g), cerium carbonate (2.67 g), and pentahydrate terbium nitrate (2.71 g), and by adding to an oxalic acid solution (7.85 g in 50 ml water). The precursor slurry was homogenized by stirring. The pH of the slurry was adjusted to 1.5 by addition of water and nitric acid. Di-ammonium hydrogen phosphate (5.48 g) was mixed with the homogenized slurry. The slurry was milled using the grinding media for 72 hrs to make it more homogeneous and to form ultra fine particles, followed by drying overnight at 120° C. The powder was ground to make it homogeneous. The homogenized powder was placed in an alumina crucible and heated at 900° C. for 2 hours in a controlled atmosphere comprising 1% hydrogen diluted with nitrogen. Flow rates of the hydrogen/nitrogen mixture were maintained at about 0.5 liters/hour. Following the heat treatment, x-ray diffraction was carried out to determine the particle size of the powder. A mean particle size of 20 nm was obtained. A spheroidal morphology of the powder was confirmed using TEM.

While typical embodiments have been set forth for the purpose of illustration, the foregoing description should not be deemed to be a limitation on the scope of the invention. Accordingly, various modifications, adaptations, and alternatives may occur to one skilled in the art without departing from the spirit and scope of the present invention.

The invention claimed is:

1. A method of making a plurality of nanoparticles, wherein the plurality of nanoparticles comprises at least one of a metal phosphate, a metal silicate, a metal oxide, a metal borate, a metal aluminate, and combinations thereof, and wherein the plurality of nanoparticles is substantially monodisperse, the method comprising the sequential steps of:
   a) providing a slurry of at least one metal precursor;
   b) maintaining the pH of the slurry at a predetermined value in a range from about 1.0 to about 3.0;
   c) mechanically milling the slurry;
   d) drying the slurry at a temperature in a range from about 100° C. to about 150° C. to form a powder; and
   e) calcining the powder at a predetermined temperature to form the plurality of nanoparticles,
   wherein said plurality of nanoparticles is substantially unagglomerated.

2. The method according to claim 1, wherein the at least one metal precursor comprises at least one of a metal nitrate, a metal chloride, a metal carbonate, a metal oxide, and a metal acetate.

3. The method according to claim 1, wherein the step of providing a slurry further comprises providing a second precursor.

4. The method according to claim 3, wherein the second precursor comprises at least one of a metal nitrate, a metal chloride, a metal carbonate, a metal oxide, a metal acetate, a borate source, a phosphate source, and a silicate source.

5. The method according to claim 1, wherein the step of providing a slurry further comprises providing a surfactant.

6. The method according to claim 5, wherein said surfactant comprises at least one of oxalic acid, sodium dodecyl sulfate, cetyltrimethylammonium bromide, phosphatidylcholine, sorbitan monostearate, polysorbate, sodium dioctylsulfosuccinate, and dioctadecyldimethylammonium bromide, and combinations thereof.

7. The method according to claim 1, wherein the step of calcining the powder at a predetermined temperature comprises heating the powder at a temperature in a range from about 600° C. to about 1200° C.

8. The method according to claim 7, wherein the step of calcining the powder at a predetermined temperature comprises heating the powder at a temperature in a range from about 800° C. to about 900° C.

9. The method according to claim 1, wherein the step of calcining the powder comprises heating the powder for between about 1 hour and about 6 hours.

10. The method according to claim 9, wherein the step of calcining the powder comprises heating the powder for between about 2 hours and about 3 hours.

11. The method according to claim 1, wherein said metal is a transition metal.

12. The method according to claim 11, wherein said transition metal comprises at least one of scandium, titanium, vanadium, chromium, manganese, iron, cobalt, nickel, copper, zinc, zirconium, niobium, molybdenum, ruthenium, rhodium, palladium, silver, cadmium, hafnium, tantalum, tungsten, rhenium, osmium, iridium, platinum, and gold.

13. The method according to claim 12, wherein said transition metal comprises at least one of titanium, zirconium, hafnium, and manganese.

14. The method according to claim 1, wherein said metal is a lanthanide group metal.

15. The method according to claim 14, wherein said lanthanide group metal comprises at least one of lanthanum, gadolinium, yttrium, lutetium, terbium, cerium, neodymium, samarium, europium, thulium, holmium, praseodymium, and dysprosium.

16. The method according to claim 15, wherein said lanthanide group metal comprises at least one of lanthanum, gadolinium, yttrium, lutetium, terbium, and cerium.

17. The method according to claim 1, wherein said plurality of nanoparticles has a mean particle size in a range from about 10 nm to about 1000 nm.

18. The method according to claim 17, wherein said plurality of nanoparticles has a mean particle size in a range from about 10 nm to about 100 nm.

19. The method according to claim 18, wherein said plurality of nanoparticles has a mean particle size in a range from about 10 nm to about 50 nm.

* * * * *